US006996269B2

(12) United States Patent
Ogawa et al.

(10) Patent No.: US 6,996,269 B2
(45) Date of Patent: Feb. 7, 2006

(54) IMAGE ENCODING APPARATUS AND IMAGE DECODING APPARATUS

(75) Inventors: Shigetaka Ogawa, Tokyo (JP); Tamotsu Kusaka, Tokyo (JP); Kouitirou Hirao, Tokyo (JP); Takahiro Honguu, Tokyo (JP)

(73) Assignee: NEC Corporation, Tokyo (JP)

( * ) Notice: Subject to any disclaimer, the term of this patent is extended or adjusted under 35 U.S.C. 154(b) by 512 days.

(21) Appl. No.: 10/160,267

(22) Filed: Jun. 4, 2002

(65) Prior Publication Data
US 2002/0181769 A1 Dec. 5, 2002

(30) Foreign Application Priority Data
Jun. 5, 2001 (JP) .................................... 2001-169580

(51) Int. Cl.
*G06K 9/00* (2006.01)

(52) U.S. Cl. ...................................... 382/166; 382/173
(58) Field of Classification Search ......... 382/173–181, 382/232–233, 243–251, 162–167; 358/1.9, 358/1.2, 538–540, 450–464, 426.11–426.16; 348/393.1, 397.1; 375/240.03, 240.08, 240.23, 375/240.25
See application file for complete search history.

(56) References Cited

U.S. PATENT DOCUMENTS

| 4,763,283 | A | * | 8/1988 | Coutrot ...................... 382/166 |
| 5,392,362 | A | * | 2/1995 | Kimura et al. |
| 5,436,981 | A | * | 7/1995 | Ishikawa |
| 5,848,185 | A | * | 12/1998 | Koga et al. .................. 382/173 |
| 5,995,665 | A | * | 11/1999 | Maeda ....................... 382/232 |
| 6,084,984 | A | * | 7/2000 | Ishikawa |
| 6,334,001 | B2 | | 12/2001 | De Queiroz et al. |
| 6,574,364 | B1 | * | 6/2003 | Economidis et al. ....... 382/166 |
| 6,594,385 | B2 | * | 7/2003 | Grohs et al. ................ 382/166 |
| 6,731,800 | B1 | * | 5/2004 | Barthel et al. .............. 382/176 |

FOREIGN PATENT DOCUMENTS

| JP | 6-014201 | * | 1/1994 |
| JP | 6-152985 | * | 5/1994 |
| JP | 11-164153 | | 6/1999 |
| JP | 11-215281 | | 8/1999 |
| JP | 11-261833 | | 9/1999 |
| JP | 2000-175053 | | 6/2000 |

* cited by examiner

Primary Examiner—Amelia M. Au
Assistant Examiner—Ishrat Sherali
(74) Attorney, Agent, or Firm—Foley & Lardner LLP

(57) ABSTRACT

In an image encoding apparatus, an image area separating section determines for each pixel whether an input original image is a line image or a plane image and outputs separation information representing a type of image for each pixel. A line image position information encoding section encodes the separation information and outputs coded line image position information. A line image generating section extracts a line image from the input original image on the basis of the separation information. A line image color information quantizing section quantizes the line image and outputs quantized line image color information. A line image color information encoding section encodes the quantized line image color information and outputs coded line image color information. A plane image generating section extracts a plane image from the input original image on the basis of the separation information. A plane image quantizing section quantizes the plane image and outputs quantized plane image information. A plane image encoding section encodes the quantized plane image information and outputs coded plane image information. An image decoding apparatus is also disclosed.

5 Claims, 9 Drawing Sheets

IMAGE ENCODING APPARATUS AND IMAGE DECODING APPARATUS

BACKGROUND OF THE INVENTION

The present invention relates to an image encoding apparatus and image decoding apparatus.

Conventionally, an image encoding apparatus which encodes an image to decrease the data amount of a color image and an image decoding apparatus which decodes encoded image data are known, as disclosed in Japanese Patent Laid-Open Nos. 6-152985 and 6-14201.

In a conventional encoding scheme such as JPEG (Joint Photographic Experts Group) for a color image, quantization is performed to improve the compression ratio. However, block distortion may be generated, or edge business may occur at a line portion or a contour portion due to the quantization. This is because common quantization processing is executed for both an image region where a high resolution is necessary and an image region where a low resolution suffices without considering the image characteristic for each pixel. For example, when block encoding is employed, like T81 recommended by ITU (International Communication Union), if the compression ratio is increased, the image quality conspicuously degrades in a region such as a line portion or contour portion having a high spatial frequency.

In addition, for the conventional image encoding/decoding apparatus, although a technique of segmenting an image into objects in accordance with characteristics and compressing the image has been proposed, no detailed proposal has been made about an actual scheme for efficiently compressing a color line image.

SUMMARY OF THE INVENTION

It is an object of the present invention to provide an image encoding apparatus and image decoding apparatus having little degradation in image quality and high compression efficiency.

In order to achieve the above object, according to the present invention, there is provided an image encoding apparatus comprising image area separating means for determining for each pixel whether an input original image is a line image or a plane image and outputting separation information representing a type of image for each pixel, line image position information encoding means for encoding the separation information output from the image area separating means and outputting coded line image position information, line image generating means for extracting a line image from the input original image on the basis of the separation information output from the image area separating means, line image color information quantizing means for quantizing the line image output from the line image generating means and outputting quantized line image color information, line image color information encoding means for encoding the quantized line image color information output from the line image color information quantizing means, and outputting coded line image color information, plane image generating means for extracting a plane image from the input original image on the basis of the separation information output from the image area separating means, plane image quantizing means for quantizing the plane image output from the plane image generating means and outputting quantized plane image information, and plane image encoding means for encoding the quantized plane image information output from the plane image quantizing means, and outputting coded plane image information.

BRIEF DESCRIPTION OF THE DRAWINGS

FIG. 6 is a view for explaining the operation of a plane image quantizing section shown in FIG. 1;

DESCRIPTION OF THE PREFERRED EMBODIMENTS

The embodiments of the present invention will be described below in detail with reference to the accompanying drawings.

Figure 1:
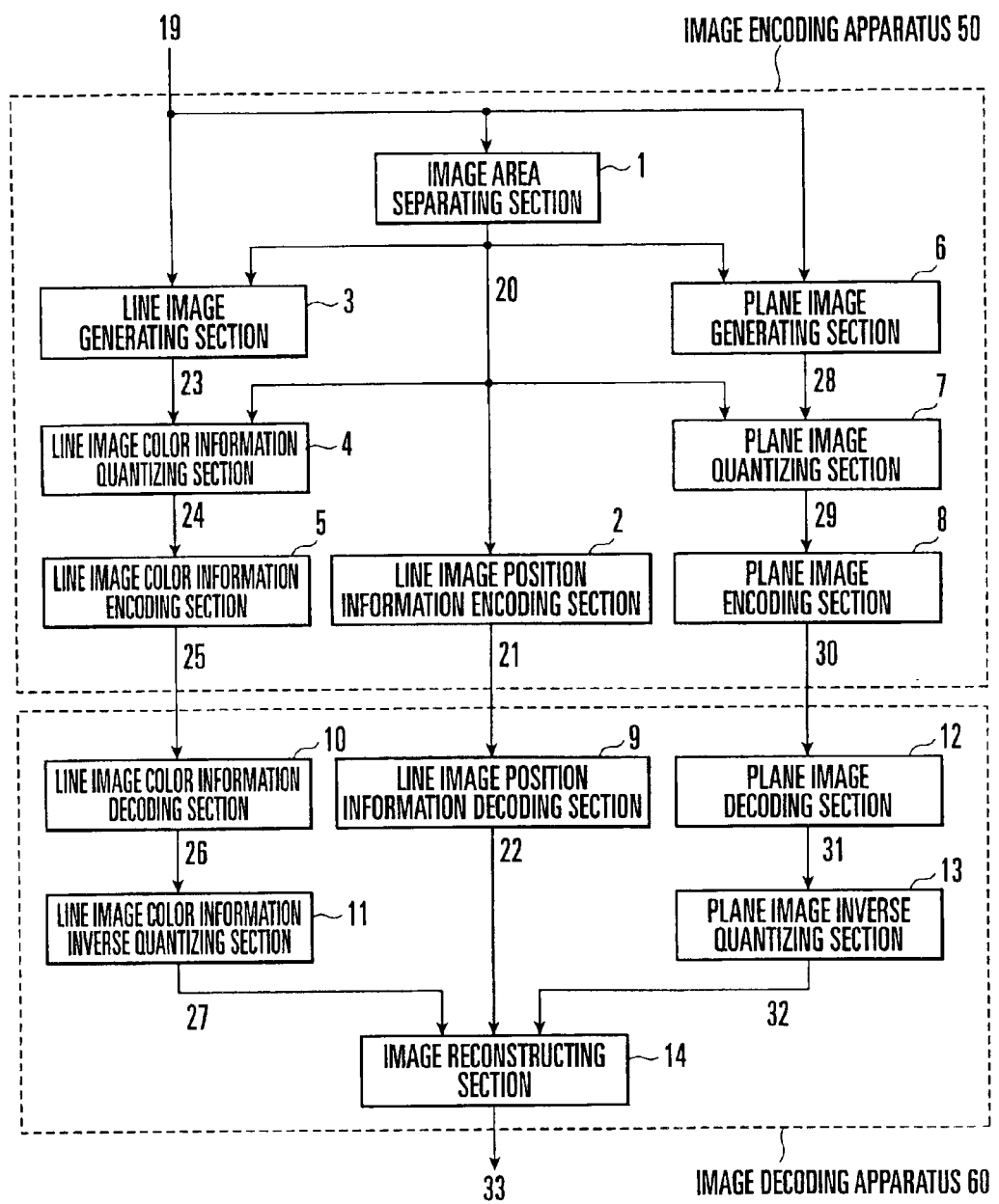
FIG. 1 is a block diagram of a color image encoding/decoding apparatus according to the first embodiment of the present invention.

FIG. 1 shows a color image encoding/decoding apparatus according to the first embodiment of the present invention. The color image encoding/decoding apparatus is constituted by an image encoding apparatus 50 and an image decoding apparatus 60. The image encoding apparatus 50 comprises an image area separating section 1 for receiving an original image 19, a line image position information encoding section 2 for receiving separation information 20 output from the image area separating section 1, a line image generating section 3 for receiving the original image 19 and separation information 20, a line image color information quantizing section 4 for receiving line image color information 23 output from the line image generating section 3, a line image color information encoding section 5 for receiving quantized line image color information 24 output from the line image color information quantizing section 4, a plane image generating section 6 for receiving the original image 19 and separation information 20, a plane image quantizing section 7 for receiving plane image information 28 output from the plane image generating section 6, and a plane image encoding section 8 for receiving quantized plane image information 29 output from the plane image quantizing section 7.

The image decoding apparatus 60 comprises a line image position information decoding section 9 for receiving coded line image position information 21 output from the line image position information encoding section 2, a line image color information decoding section 10 for receiving coded line image color information 25 output from the line image color information encoding section 5, a line image color information inverse quantizing section 11 for receiving inversely unquantized/decoded line image color information 26 output from the line image color information decoding section 10, a plane image decoding section 12 for receiving coded plane image information 30 output from the plane image encoding section 8, a plane image inverse quantizing section 13 for receiving an inversely unquantized/decoded plane image 31, and an image reconstructing section 14 for receiving decoded line image position information 22 output from the line image position information decoding section 9, decoded line image color information 27 output from the line image color information inverse quantizing section 11, and a decoded plane image 32 output from the plane image inverse quantizing section 13.

The operation of the image encoding apparatus 50 having the above arrangement will be described next.

The image area separating section 1 determines for each pixel whether the input original image 19 formed from 24 bits (8 bits for each of "RGB (Red, Green, Blue)") is a line image or a plane image, and outputs the separation information 20 representing for each pixel whether the image is a line image or a plane image. The input original image 19 is assumed to be RGB data. However, any other color space data such as "Lab" or "YUV" may be used. The separation information 20 is binary information representing a line image or plane image.

The line image position information encoding section 2 outputs the coded line image position information 21 which is obtained by encoding the separation information 20 by binary encoding while defining a line image as "1" and a plane image as "0".

Figure 2:
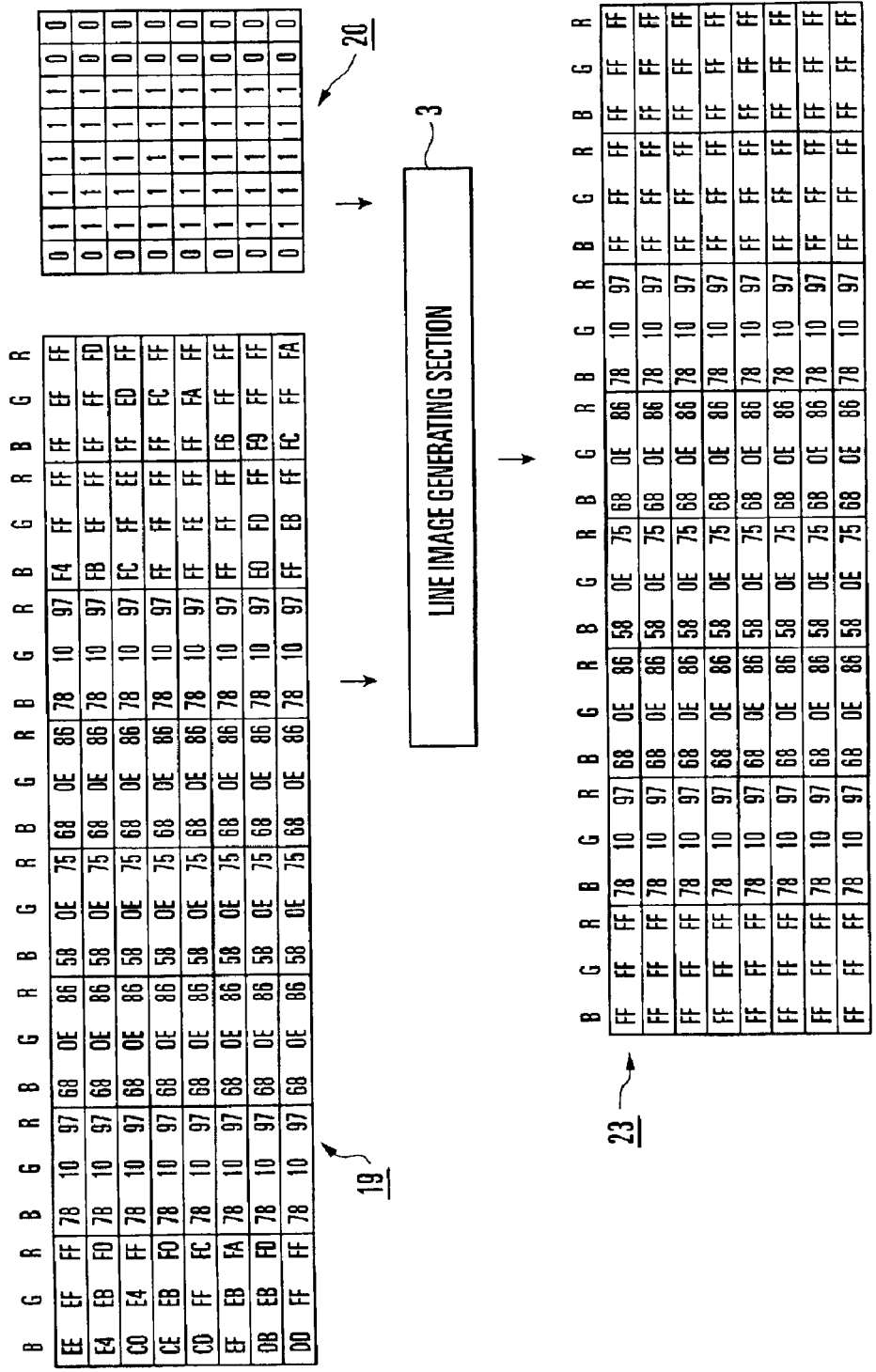
FIG. 2 is a view for explaining the operation of a line image generating section shown in FIG. 1.

The line image generating section 3 outputs the line image color information 23 from the input original image 19 and separation information 20. The operation of the line image generating section 3 when both the input original image 19 and the separation information 20 have 8×8 pixels will be described with reference to FIG. 2. Referring to FIG. 2, a pixel "EE EF FF" of the input original image 19 indicates that B="0XEE", G="0XEF", and R="0XFF" (0X indicates hexadecimal notation). In the separation information 20, "1" represents a line image, and "0" represents a plane image.

The line image generating section 3 obtains the logic between the input original image 19 and the separation information 20 for each pixel. More specifically, for a pixel in the input original image 19, for which corresponding separation information 20 indicates a line image, the 8-bit RGB data are directly output. On the other hand, for a pixel in the input original image 19, for which corresponding separation information 20 indicates a plane image, the 8-bit RGB data are masked by "0XFF" and output. In this way, the line image color information 23 as shown in FIG. 2 is generated.

For a plane image, all the RGB data are masked by "0XFF" to obtain white data. However, the present invention is not limited to this. Any other mask value can be selected if it ensures a high compression efficiency in the line image color information encoding section 5 on the output side. Since data decoded on the plane image side is selected for a masked pixel independently of the mask value, a reconstructed image 33 is not affected.

Figure 3:
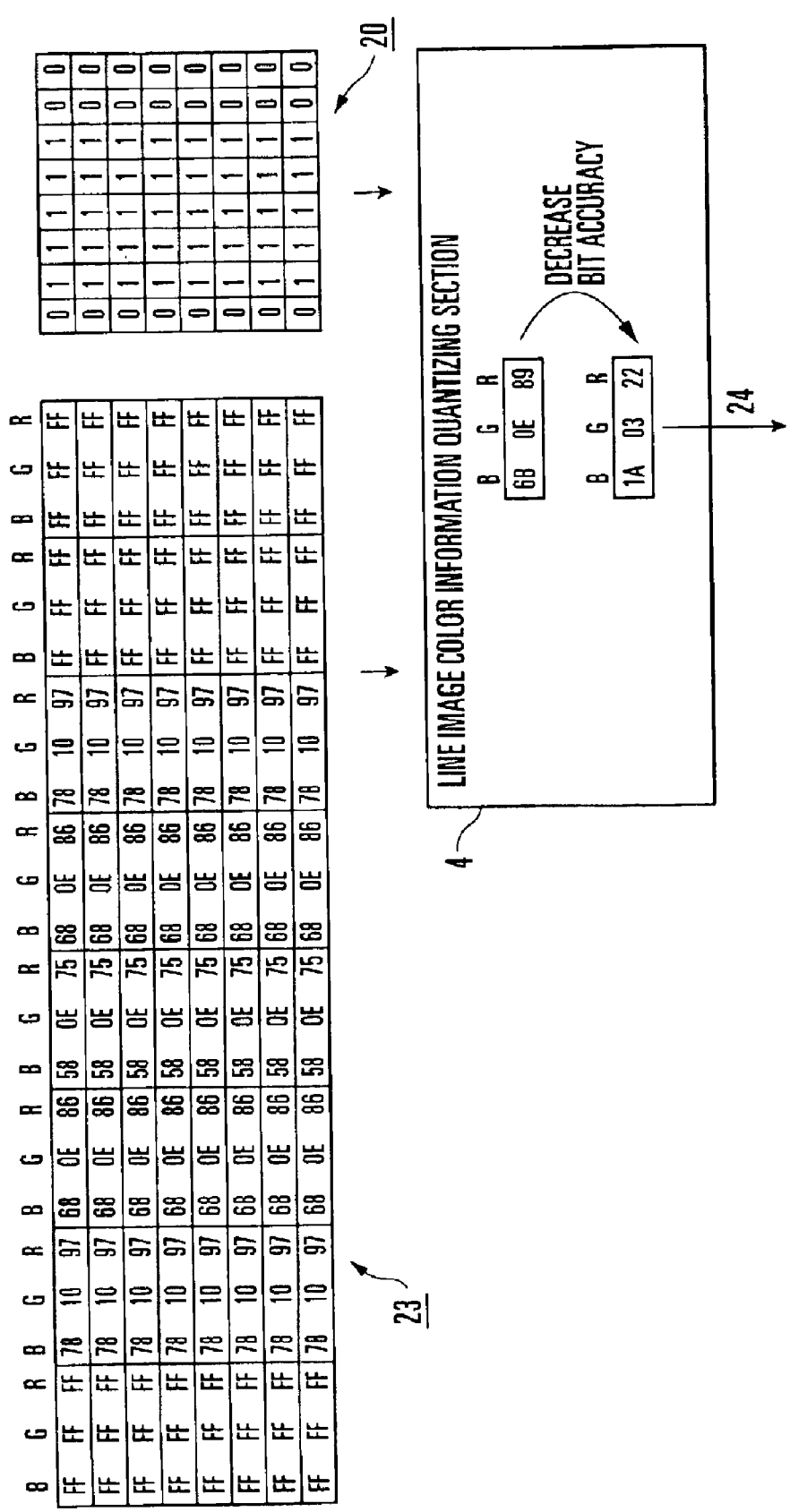
FIG. 3 is a view for explaining the operation of a line image color information quantizing section shown in FIG. 1.

The line image color information quantizing section 4 receives the line image color information 23 and separation information 20, quantizes and compresses the line image color information 23, and outputs the quantized line image color information 24. Quantization can be done in various ways. As shown in FIG. 3, the color average of line images is obtained for each block including 8×8 pixels. The obtained average color is set as the representative color of the block whereby the information amount of the line image color information 23 is quantized and compressed.

Referring to FIG. 3, there are 40 pixels of a line image in a block including 8×8 pixels. The average color of this line image is represented by B="0X6B", G="0X0E", and R="0X89". The separation information 20 is used to determine whether a corresponding pixel in the line image color information 23 is a line image or a plane image.

In addition to quantization by a representative color, the line image color information quantizing section 4 also quantizes and compresses the gray level by deleting lower bits of the RGB data. The result obtained by quantizing the gray level is B="0X1A", G="0X03", and R="0X22". In this case, lower two bits are deleted from each of the RGB colors. The result obtained by quantizing the color and gray level is output as the quantized line image color information 24.

Figure 4:
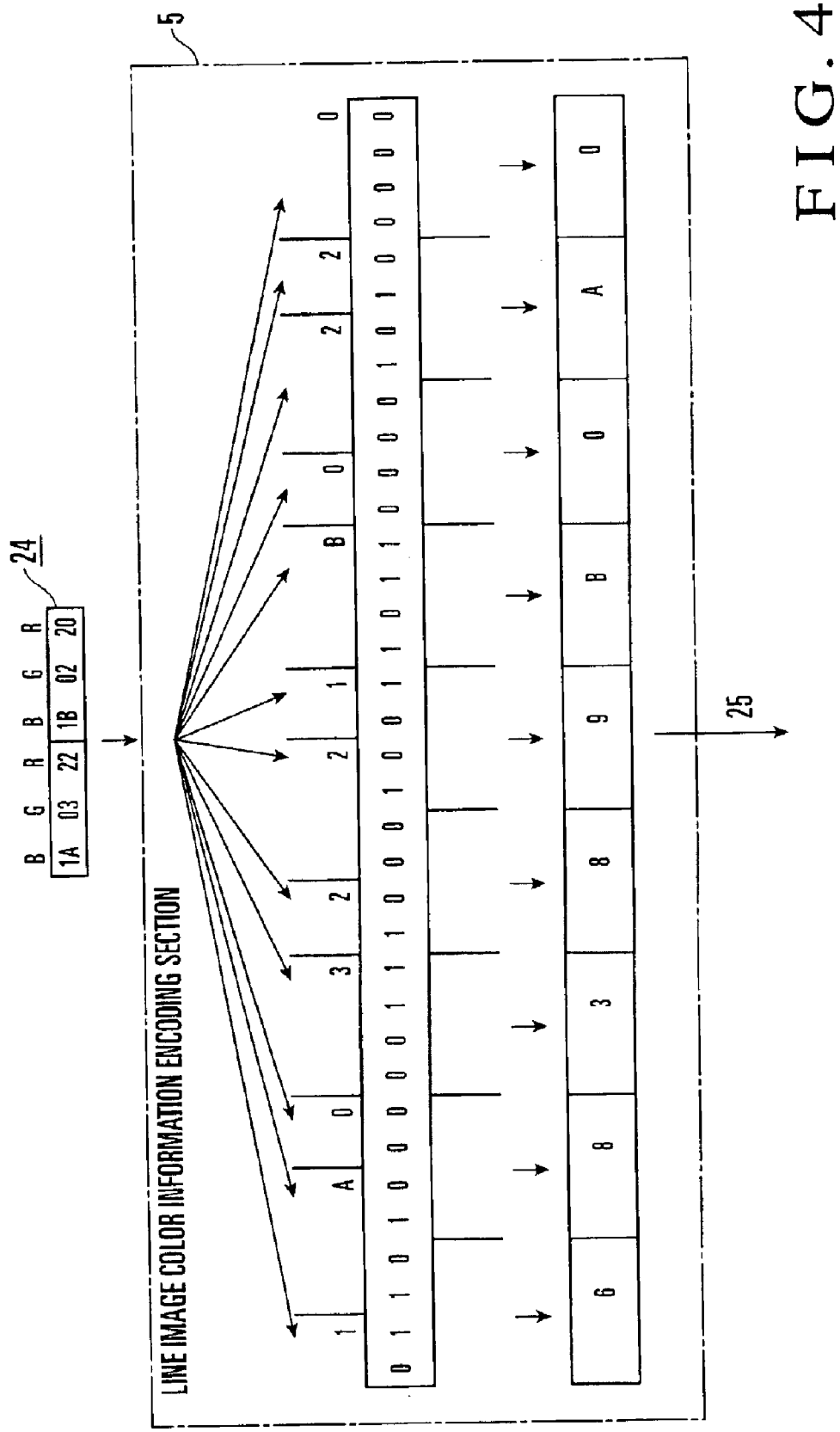
FIG. 4 is a view for explaining the operation of a line image color information encoding section shown in FIG. 1.

The line image color information encoding section 5 outputs the coded line image color information 25 obtained by encoding the quantized line image color information 24 output from the line image color information quantizing section 4. In this embodiment, as shown in FIG. 4, a value of the quantized line image color information 24 is directly used as a code word. Since the line image color information quantizing section 4 has executed bit-quantization into 6 bits per color, the bits are rearranged to remove spaces.

Other than the above encoding method, Huffman coding may be used, in which the data occurrence probability of the quantized line image color information 24 is checked to generate a Huffman table, and Huffman codes are generated. Alternatively, DPCM (Differential Pulse Code Modulation) coding for generating DPCM codes by calculating differences between adjacent blocks may be used.

Figure 5:
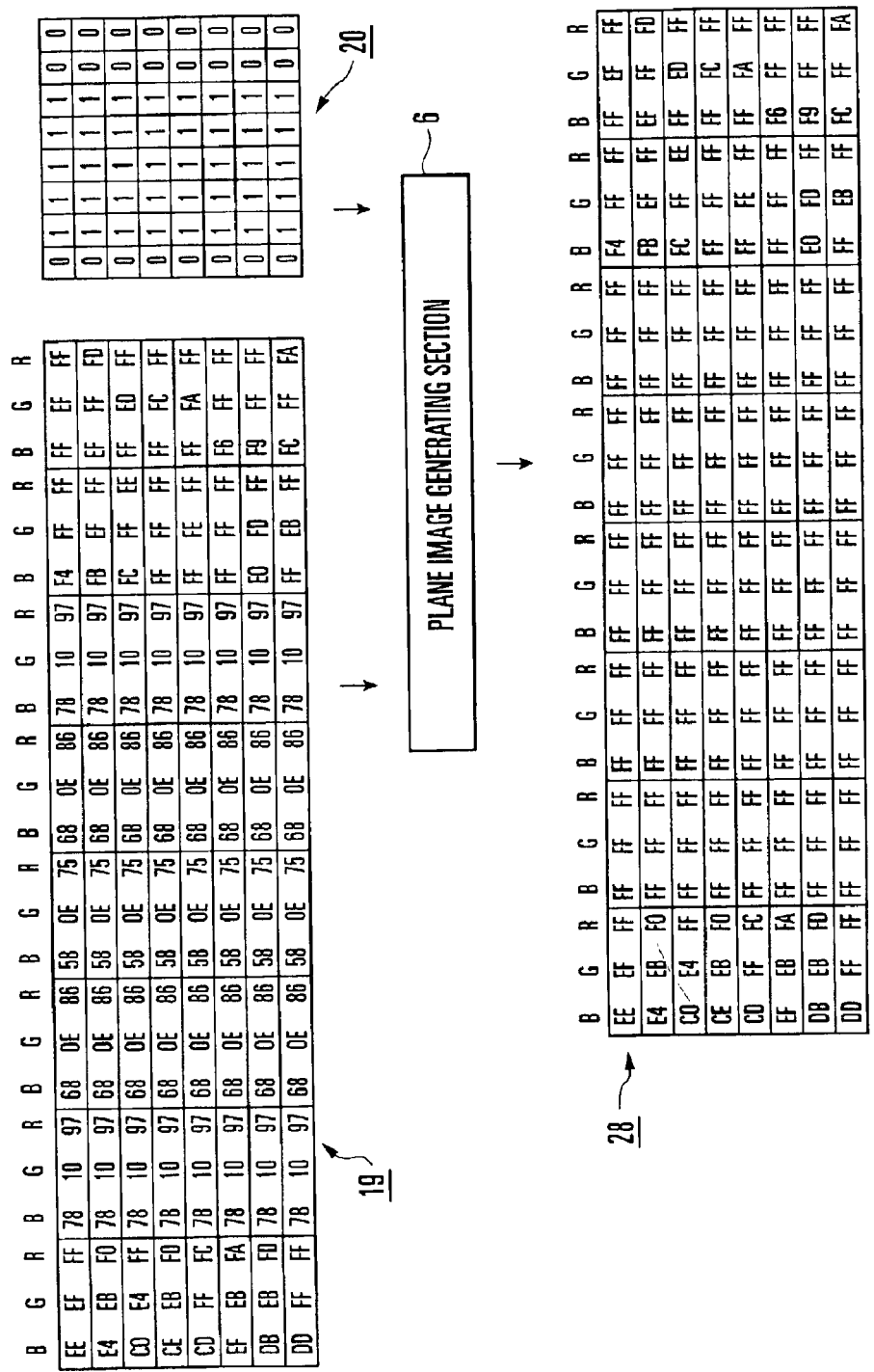
FIG. 5 is a view for explaining the operation of a plane image generating section shown in FIG. 1.

The plane image generating section 6 outputs the plane image information 28 from the input original image 19 and separation information 20. The operation of the plane image generating section 6 when both the input original image 19 and the separation information 20 have 8×8 pixels will be described with reference to FIG. 5. The plane image generating section 6 obtains the logic between the input original image 19 and the separation information 20 for each pixel. For a pixel in the input original image 19, for which corresponding separation information 20 indicates a plane image, the 8-bit RGB data are directly output. On the other hand, for a pixel in the input original image 19, for which corresponding separation information 20 indicates a line image, the 8-bit RGB data are masked by "0XFF" and output. In this way, the plane image information 28 as shown in FIG. 5 is generated.

For a line image, all the RGB data are masked by "0XFF" to obtain white data. However, the present invention is not limited to this. Any other mask value can be selected if it ensures a high compression efficiency in the plane image color information encoding section 8 on the output side. Since data decoded on the line image side is selected for a masked pixel independently of the mask value, the reconstructed image 33 is not affected.

Figure 6:
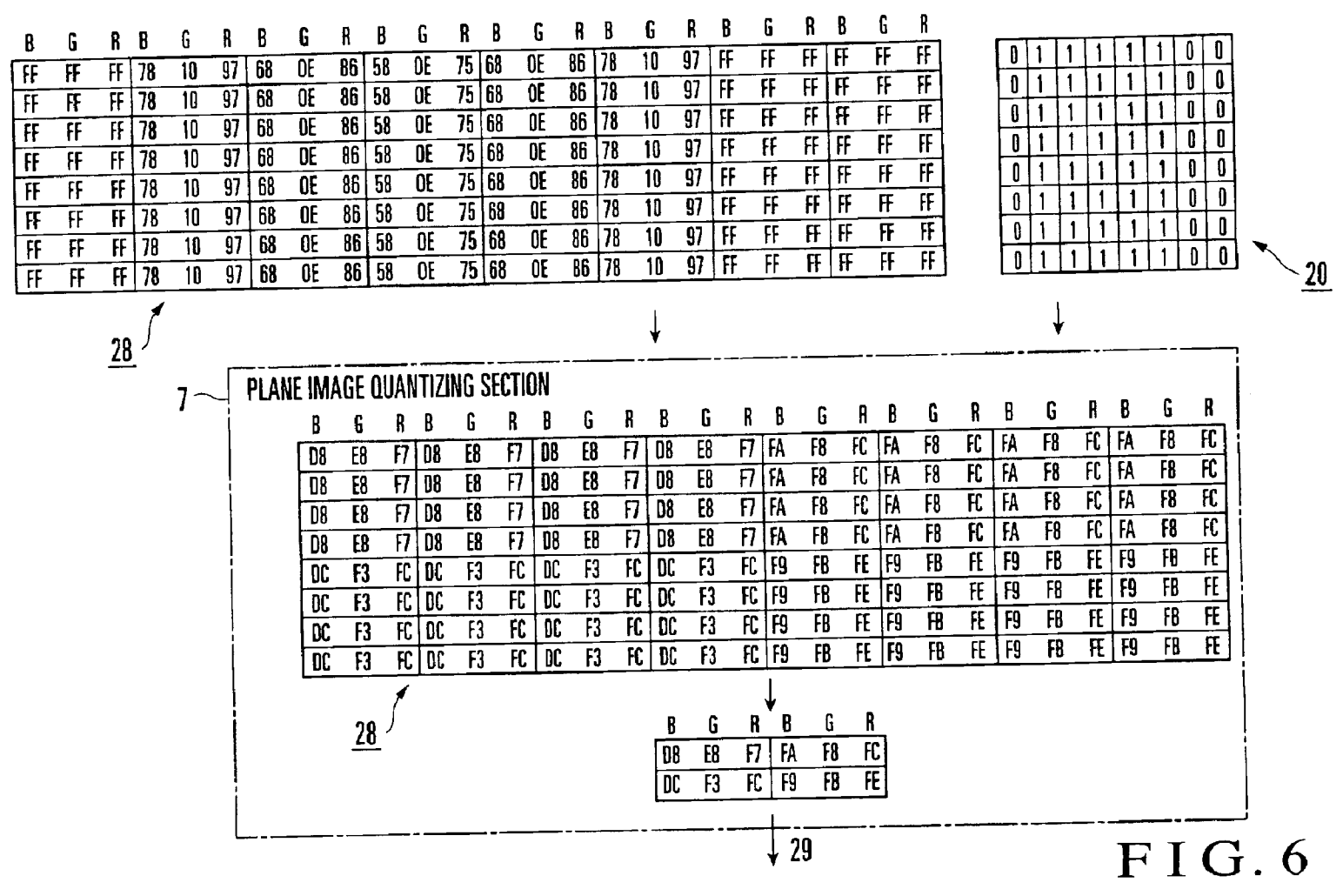

The plane image quantizing section 7 receives the plane image information 28 and separation information 20, quantizes and compresses the plane image information 28, and outputs the quantized plane image information 29. Quantization can be done in various ways. In this embodiment, as shown in FIG. 6, the color average of plane images is obtained for each block including 4×4 pixels. The obtained average color is set as the representative color of the block whereby the information amount of the plane image information 28 is quantized and compressed. The separation information 20 is used to determine whether a corresponding pixel in the plane image information 28 is a line image or a plane image.

The plane image encoding section 8 outputs the coded plane image information 30 obtained by encoding and compressing the quantized plane image information 29. Various kinds of encoding schemes can be used. In this embodiment, T81 recommended by ITU is used. The quantized plane image information 29 is regarded as a ¼ reduced image and encoded by executing DCT (Discrete Cosine Transform) while setting one pixel as a representative point.

The operation of the image decoding apparatus 60 will be described next.

The line image position information decoding section 9 outputs the decoded line image position information 22 obtained by decoding the coded line image position information 21. The encoding scheme of the line image position information encoding section 2 and the decoding scheme of the line image position information decoding section 9 are not related to each other. The encoding side and decoding side only need to use identical schemes. Any standardized communication code such as MH (Modified Huffman), MR (Modified Read), MMR (Modified Modified Read), or JBIG (Joint Bi-level Image experts Group) or equal-length code may be used.

The line image color information decoding section 10 performs operation reverse to that of the line image color information encoding section 5. That is, the line image color information decoding section 10 outputs the inversely unquantized/decoded line image color information 26 obtained by decoding the coded line image color information 25. The line image color information inverse quantizing section 11 performs operation reverse to that of the line image color information quantizing section 4. That is, the line image color information inverse quantizing section 11 outputs the decoded line image color information 27 obtained by inversely quantizing the inversely unquantized/decoded line image color information 26.

The plane image decoding section 12 performs operation reverse to that of the plane image encoding section 8. That is, the plane image decoding section 12 outputs the inversely unquantized/decoded plane image 31 obtained by decoding the coded plane image information 30. The plane image inverse quantizing section 13 performs operation reverse to that of the plane image quantizing section 7. That is, the plane image inverse quantizing section 13 outputs the decoded plane image 32 obtained by inversely quantizing the inversely unquantized/decoded plane image 31.

For a pixel whose decoded line image position information 22 indicates a line image, the image reconstructing section 14 extracts the RGB data of a corresponding pixel from the decoded line image color information 27. For a pixel whose decoded line image position information 22 indicates a plane image, the image reconstructing section 14 extracts the RGB data of a corresponding pixel from the decoded plane image 32. In this way, the original image is reconstructed and output as the reconstructed image 33.

In this embodiment, the separation information 20 represents the position of a line image. The separation information 20 is not quantized. Since the line image color information is quantized to a representative color for each block, the color of the line image degrades. However, the spatial resolution of a line drawing is determined by the separation information 20 and therefore does not degrade. Hence, any degradation in image at a contour portion of a picture or a line drawing portion of a character or graphic pattern can be suppressed.

Figure 7:
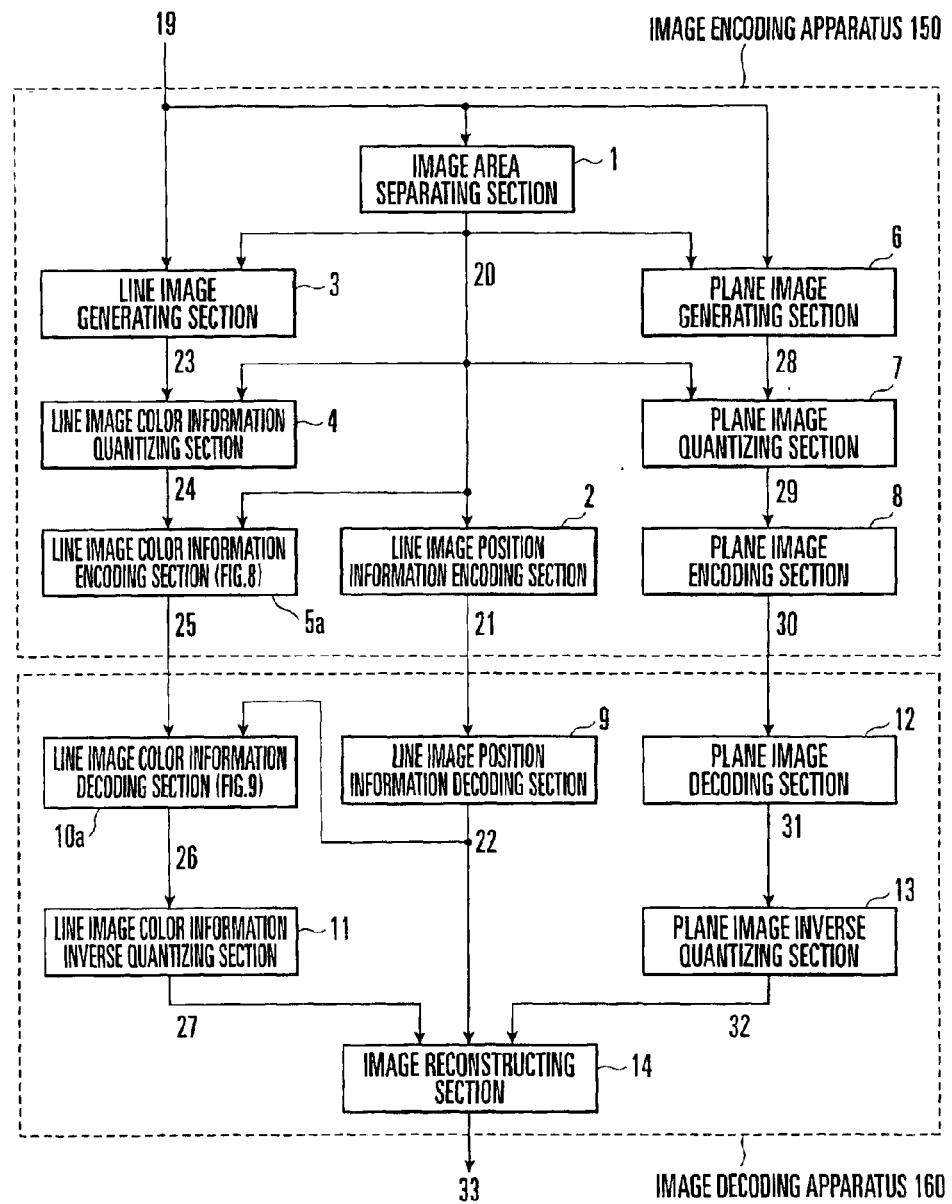
FIG. 7 is a block diagram of a color image encoding/decoding apparatus according to the second embodiment of the present invention.

FIG. 7 shows a color image encoding/decoding apparatus according to the second embodiment of the present invention. The same reference numerals as in FIG. 1 denote the same parts in FIG. 7, and a description thereof will be omitted. The second embodiment is different from the first embodiment in a line image color information encoding section 5a of an image encoding apparatus 150 and a line image color information decoding section 10a of an image decoding apparatus 160.

The line image color information encoding section 5 according to the first embodiment encodes a given block even when the block that is quantized by the line image color information quantizing section 4 has no pixel of a line image. Data to be encoded has a value obtained by quantizing, by the line image color information encoding section 5, a value used for a mask by the line image generating section 3. To the contrary, the line image color information encoding section 5a according to the second embodiment does not execute encoding when a block quantized by a line image color information quantizing section 4 has no pixel of a line image.

Figure 8:
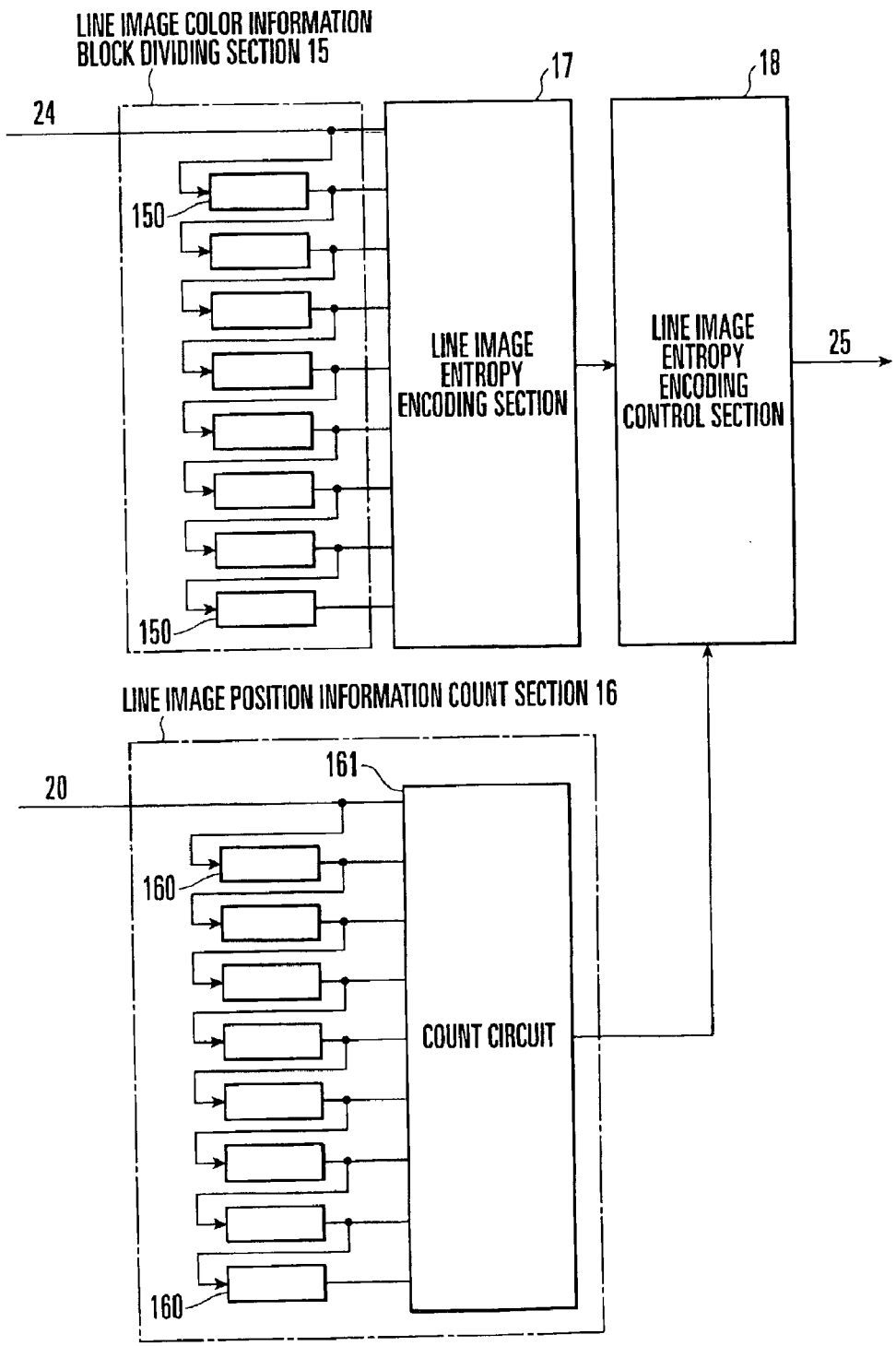
FIG. 8 is a block diagram of a line image color information encoding section shown in FIG. 7.

As shown in FIG. 8, the line image color information encoding section 5a comprises a line image color information block dividing section 15, line image position information count section 16, line image entropy encoding section 17, and line image entropy encoding control section 18. The line image color information block dividing section 15 has n (n is a natural number, and 8 in this embodiment) line memories 150 each of which delays quantized line image color information 24 output from the line image color information quantizing section 4 by one line. With this arrangement, the quantized line image color information 24 corresponding to n lines is simultaneously delayed and input to the line image entropy encoding section 17.

The line image entropy encoding section 17 divides the quantized line image color information 24 corresponding to the n line for every m (m is a natural number, and 8 in this embodiment) pixels and entropy-encodes the quantized line image color information 24 for each block including n×m pixels. The line image position information count section 16 has n line memories 160 each of which delays separation information 20 output from an image area separating section 1 by one line. With this arrangement, the separation information 20 corresponding to n lines is simultaneously delayed and input to a count circuit 161.

The count circuit 161 divides the separation information 20 corresponding to n lines for every m pixels and counts the number of pixels of a line image in a block including n×m pixels. When the count value of the count circuit 161 is "0", i.e., the block of n×m pixels has no pixel of a line image, the line image entropy encoding control section 18 discards a corresponding block of coded line image color information 25 output from the line image entropy encoding section 17 without outputting the block. On the other hand, when the count value of the count circuit 161 is not "0", the line image entropy encoding control section 18 directly outputs a corresponding block of the coded line image color information 25 output from the line image entropy encoding section 17. Since no code word is generated for a block that does not influence a reconstructed image 33, the compression efficiency can be made higher than that of the first embodiment.

Figure 9:
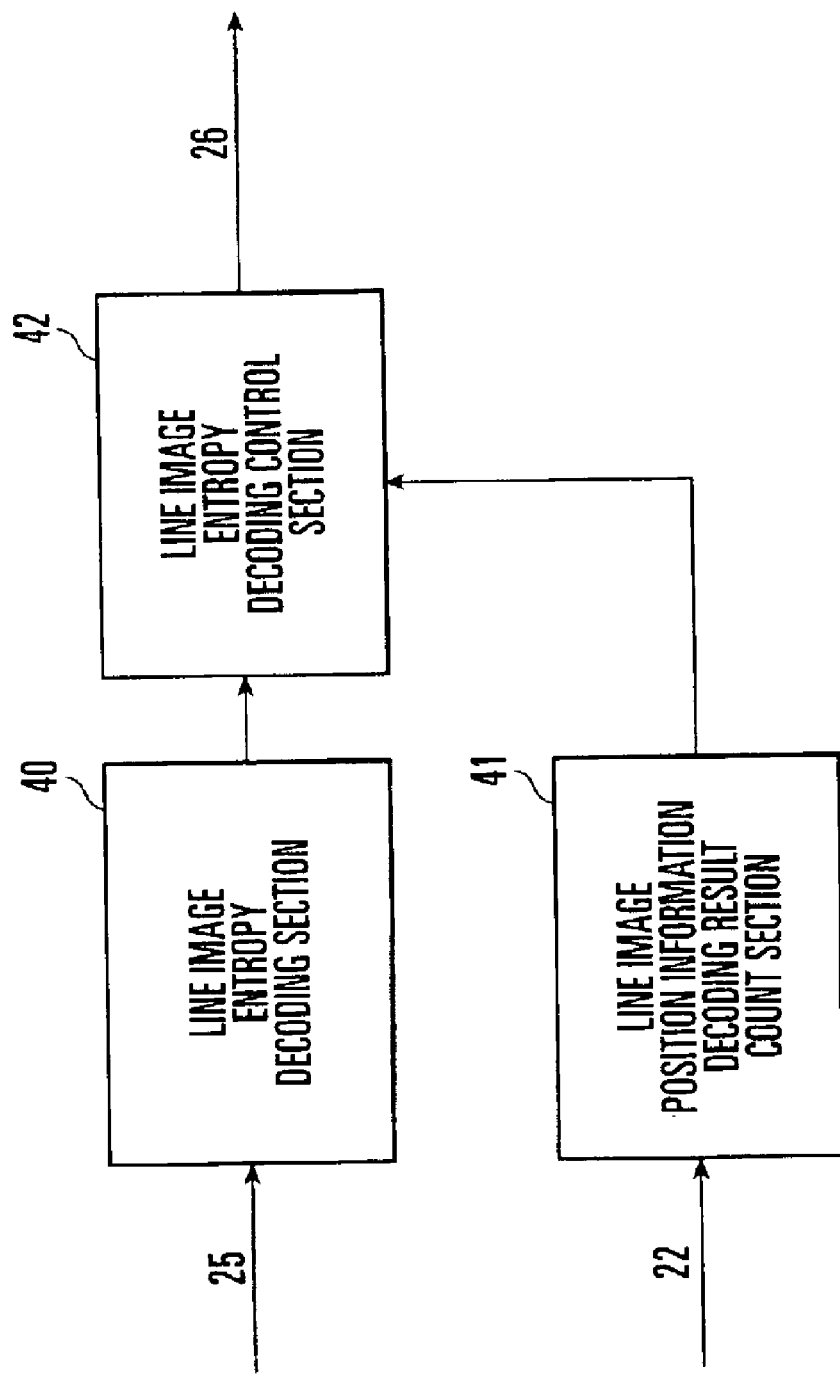
FIG. 9 is a block diagram showing the arrangement of a line image color information decoding section shown in FIG. 7.

As shown in FIG. 9, the line image color information decoding section 10a comprises a line image entropy decoding section 40, line image position information decoding result count section 41, and line image entropy decoding control section 42. The line image entropy decoding section 40 performs operation reverse to that of the line image entropy encoding section 17. The line image entropy decoding section 40 decodes the coded line image color information 25 and outputs inversely unquantized/decoded line image color information 26 for each block of n×m pixels. The line image position information decoding result count section 41 counts the number of pixels of a line image for each block of n×m pixels on the basis of decoded line image position information 22.

The line image entropy decoding control section 42 temporarily holds the inversely unquantized/decoded line image color information 26 output from the line image entropy decoding section 40. When the count value of the line image position information decoding result count section 41 is not 0, the line image entropy decoding control section 42 directly outputs the oldest block in the held inversely unquantized/decoded line image color information 26.

On the other hand, when the count value of the line image position information decoding result count section 41 is 0, the line image entropy decoding control section 42 outputs a mask value for each block including n×m pixels. This mask value corresponds to a plane image and equals a value obtained by quantizing, by the line image color information encoding section 5, the mask value used by the line image generating section 3. In this way, the inversely unquantized/decoded line image color information 26 is decoded, as in the first embodiment.

As has been described above, according to the present invention, separation information (position information) that is associated with the resolution characteristic of a line image is encoded without quantization. Only the color information of the line image is quantized and encoded. For a plane image, the resolution is quantized and encoded. For this reason, the compression efficiency can be increased by quantizing only color information without degrading the resolution (spatial frequency) of a line image. As a consequence, for a color image containing both characters and graphic patterns, an encoding scheme capable of suppressing any degradation in image quality at a contour portion of a picture or a line portion of a character or graphic pattern and having a high compression efficiency can be realized.

In addition, according to the present invention, the scale of development required for LSIs or the like can be small. This is because a standard scheme such as JPEG or JBIG can be used to encode plane image and line image position information, and a circuit capable of sending raster data can be used to encode line image color information.

When the count value of line image position information is 0, a block, corresponding to the count value, of coded line image color information output from the line image entropy encoding section is discarded without being output. Hence, the compression efficiency can be further increased.

What is claimed is:

1. An image encoding apparatus comprising:
    image area separating means for determining for each pixel whether an input original image is a line image or a plane image and outputting separation information representing a type of image for each pixel;
    line image position information encoding means for encoding the separation information output from said image area separating means and outputting coded line image position information;
    line image generating means for extracting a line image from the input original image on the basis of the separation information output from said image area separating means;
    line image color information quantizing means for quantizing the line image output from said line image generating means and outputting quantized line image color information;
    line image color information encoding means for encoding the quantized line image color information output from said line image color information quantizing means, and outputting coded line image color information;
    plane image generating means for extracting a plane image from the input original image on the basis of the separation information output from said image area separating means;
    plane image quantizing means for quantizing the plane image output from said plane image generating means and outputting quantized plane image information; and
    plane image encoding means for encoding the quantized plane image information output from said plane image quantizing means and outputting coded plane image information.

2. An apparatus according to claim 1, wherein
    said line image generating means extracts the line image from the input original image and outputs line image color information, and
    said line image color information quantizing means quantizes the line image color information output from said line image generating means and outputs the quantized line image color information.

3. An apparatus according to claim 1, wherein said line image color information encoding means comprises
    line image color information block dividing means for dividing the quantized line image color information output from said line image color information quantizing means into blocks each including n×m pixels (n and m are natural numbers),
    line image entropy encoding means for entropy-encoding quantized divided line image color information output from said line image color information block dividing means and outputting the information as the coded line image color information,
    line image position information count means for counting the number of pixels of a line image for each of the divided blocks on the basis of the separation information output from said image area separating means, and
    line image entropy encoding control means for, when a count value of said line image position information count means is not 0, directly outputting a block, corresponding to the count value, of the coded line image color information output from said line image entropy encoding means, and when the count value is 0, discarding the block, corresponding to the count value, of the coded line image color information output from said line image entropy encoding means.

4. An image decoding apparatus comprising:
    line image position information decoding means for decoding coded line image position information which represents for each pixel whether an original image is a line image or a plane image and outputting decoded line image position information;
    line image color information decoding means for decoding coded line image color information obtained by quantizing and encoding a line image in the original image and outputting inversely unquantized/decoded line image color information;
    line image color information inverse quantizing means for outputting decoded line image color information obtained by inversely quantizing the inversely unquantized/decoded line image color information output from said line image color information decoding means;

plane image decoding means for decoding coded plane image information obtained by quantizing and encoding a plane image in the original image and outputting an inversely unquantized/decoded plane image;

plane image inverse quantizing means for inversely quantizing the inversely unquantized/decoded plane image output from said plane image decoding means; and image reconstructing means for outputting a reconstructed image of the original image from the decoded line image position information output from said line image position information decoding means, the decoded line image color information output from said line image color information inverse quantizing means, and the plane image decoding output from said plane image inverse quantizing means.

5. An apparatus according to claim 4, wherein said line image color information decoding means comprises line image entropy decoding means for decoding the coded line image color information output from line image color information encoding means and outputting the inversely unquantized/decoded line image color information for each block including n×m pixels (n and m are natural numbers), line image position information decoding result count means for counting the number of pixels of a line image for each block on the basis of the decoded line image position information output from said line image position information decoding means, and line image entropy decoding control means for temporarily holding a block of the inversely unquantized/decoded line image color information output from said line image entropy decoding means, when a count value of said line image position information decoding result count means is not 0, directly outputting an oldest block in held blocks, and when the count value is 0, outputting a mask value for each block.

* * * * *